US009559736B2

(12) United States Patent
Hsu et al.

(10) Patent No.: US 9,559,736 B2
(45) Date of Patent: Jan. 31, 2017

(54) AUTO-SELECTION METHOD FOR MODELING SECONDARY-PATH ESTIMATION FILTER FOR ACTIVE NOISE CONTROL SYSTEM

(71) Applicant: MediaTek Inc., Hsin-Chu (TW)

(72) Inventors: Chao-Ling Hsu, Hsinchu (TW);
Li-Wei Cheng, New Taipei (TW);
Chieh-Cheng Cheng, Hsinchu (TW);
Yiou-Wen Cheng, Hsinchu (TW);
Chih-Ping Lin, Wandan Township, Pingtung County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/717,115

(22) Filed: May 20, 2015

(65) Prior Publication Data
US 2016/0344433 A1 Nov. 24, 2016

(51) Int. Cl.
*H04B 1/10* (2006.01)
*G10K 11/00* (2006.01)
*H04B 1/12* (2006.01)

(52) U.S. Cl.
CPC ............ *H04B 1/1081* (2013.01); *H04B 1/123* (2013.01)

(58) Field of Classification Search
CPC ....... G01K 11/00; G01K 11/175; G01K 11/02; G01K 2210/00; H04B 1/1081; H04B 1/123
USPC ............... 381/71.11; 455/296, 305, 306, 307
See application file for complete search history.

(56) References Cited

U.S. PATENT DOCUMENTS

| | | | | |
|---|---|---|---|---|
| 8,565,443 | B2 * | 10/2013 | Wurm | G10K 11/178 381/71.11 |
| 8,600,069 | B2 * | 12/2013 | Lee | H04S 7/00 381/122 |
| 9,066,176 | B2 * | 6/2015 | Hendrix | H04R 5/033 |
| 9,247,346 | B2 * | 1/2016 | Kuo | H04R 3/002 |
| 2010/0014685 | A1 * | 1/2010 | Wurm | G10K 11/178 381/71.11 |
| 2010/0195844 | A1 * | 8/2010 | Christoph | G10K 11/178 381/71.11 |
| 2011/0305347 | A1 * | 12/2011 | Wurm | G10K 11/178 381/71.1 |
| 2014/0072135 | A1 * | 3/2014 | Bajic | G10K 11/1784 381/71.11 |
| 2014/0341388 | A1 * | 11/2014 | Goldstein | H04R 1/1083 381/71.11 |
| 2015/0086031 | A1 * | 3/2015 | Goto | G10K 11/178 381/71.8 |

(Continued)

Primary Examiner — Blane Jackson
(74) Attorney, Agent, or Firm — McClure, Qualey & Rodack, LLP

(57) ABSTRACT

An active noise control system and associated auto-selection method for modeling a secondary path for the active noise control system are provided. The method includes the steps of: receiving a reference signal; filtering the reference signal with a secondary-path estimation filter to obtain a filtered reference signal, wherein the secondary path estimation filter is determined from a plurality of candidate secondary-path estimation filters; filtering the reference signal with an adaptive filter to provide a compensation signal; sensing a residual noise signal at a listening position of the active noise control system; and adapting filter coefficients of the adaptive filter according to the residual noise signal and the filtered reference signal.

28 Claims, 9 Drawing Sheets

(56) References Cited

U.S. PATENT DOCUMENTS

| | | | |
|---|---|---|---|
| 2015/0228292 A1* | 8/2015 | Goldstein | G10L 21/0208 381/71.6 |
| 2015/0243271 A1* | 8/2015 | Goldstein | G10L 21/0208 381/71.6 |
| 2016/0125866 A1* | 5/2016 | Park | G10K 11/175 381/71.11 |

* cited by examiner

AUTO-SELECTION METHOD FOR MODELING SECONDARY-PATH ESTIMATION FILTER FOR ACTIVE NOISE CONTROL SYSTEM

BACKGROUND OF THE INVENTION

Field of the Invention

The invention relates to active noise control, and, in particular, to an auto-selection method and associated active noise control system for modeling secondary-path estimation filters capable of performing auto-selection of secondary-path estimation filters to compensate noise.

Description of the Related Art

The purpose of active noise control is to generate an anti-noise signal from a speaker to minimize or cancel the noise level of the original signal. Conventional noise control techniques use passive treatments to minimize the noise level. For example, the automobile industry minimizes the noise level in the car cabin by using mufflers to absorb the engine noise. These conventional noise control techniques can minimize noise that has a medium or high frequencies. However, these techniques cannot minimize noise that has a low frequency. With active noise control, an anti-noise signal with the same low frequency as the low-frequency noise signal can be produced. The phases of the anti-noise signal are opposite to those of the low-frequency noise signal. When the two signals reach the same point, they satisfy the superposition principle and negate each other.

The filtered-x least mean square (FxLMS) algorithm is the most popular adaptive algorithm for active noise control (ANC) systems, due mainly to its simplicity and robust performance. However, the convergence speed of the FxLMS algorithm is slow. Furthermore, its performance is degraded when there is a large measurement noise in the reference and error signals.

Accordingly, there is demand for an active noise control system and associated method to solve the aforementioned issue.

BRIEF SUMMARY OF THE INVENTION

A detailed description is given in the following embodiments with reference to the accompanying drawings.

An active noise control system and associated auto-selection method for modeling a secondary path for the active noise control system are provided. The method includes the steps of: receiving a reference signal; filtering the reference signal with a secondary-path estimation filter to obtain a filtered reference signal, wherein the secondary path estimation filter is determined from a plurality of candidate secondary-path estimation filters; filtering the reference signal with an adaptive filter to provide a compensation signal; sensing a residual noise signal at a listening position of the active noise control system; and adapting a plurality of filter coefficients of the adaptive filter according to the residual noise signal and the filtered reference signal.

An active noise control system is provided. The active noise control system includes: a secondary-path estimation filter configured to filter a reference signal to obtain a filtered reference signal; an adaptive filter configured to filter the reference signal to provide a compensation signal; and a computation unit configured to determine the secondary path estimation filter from a plurality of candidate secondary-path estimation filters. The computation unit further adapts a plurality of filter coefficients of the adaptive filter according to the filtered reference signal and a residual noise signal sensed by an error microphone deployed at a listening position of the active noise control system.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1A:
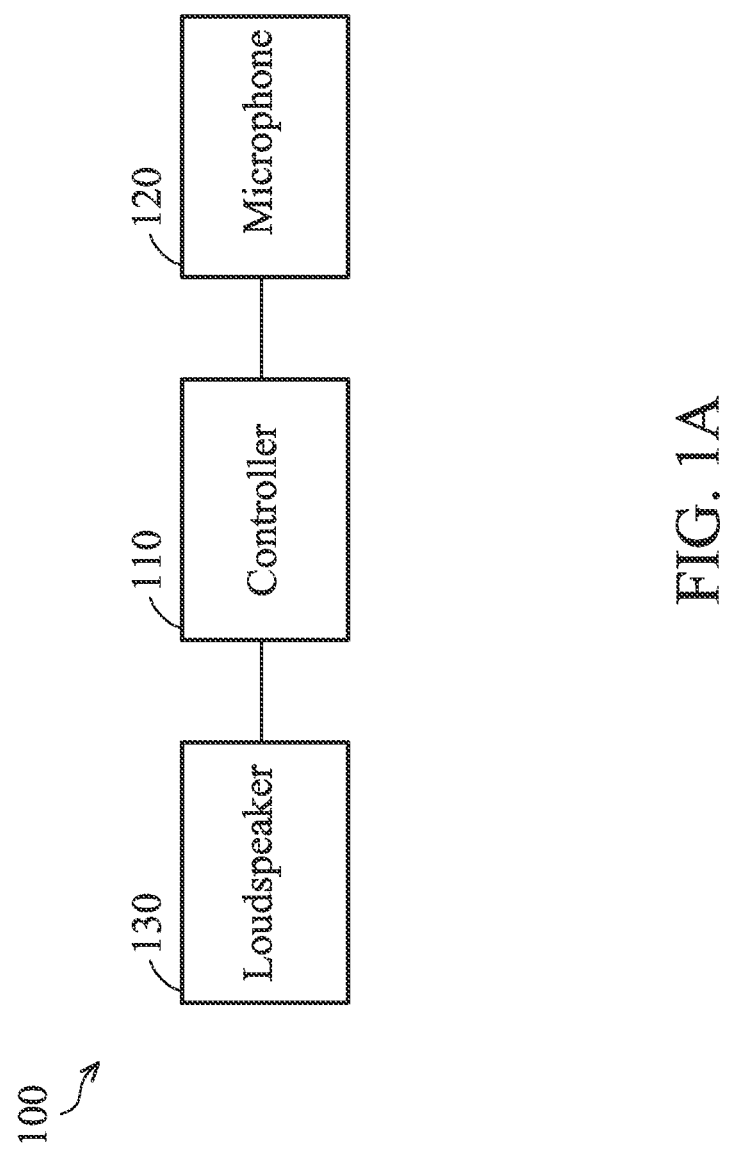
FIG. 1A is a block diagram of an active noise control (ANC) system in accordance with an embodiment of the invention.

FIG. 1A is a block diagram of an active noise control (ANC) system using the FXLMS algorithm in accordance with an embodiment of the invention. The active noise control system 100 comprises a controller 110, a microphone 120, and a loudspeaker 130. In the active noise control system 100, the microphone 120 is placed in the sound field where the user wants to minimize the noise. The microphone 120 in the sound field is known as the "error microphone". The controller 110 is configured to perform filtering and LMS calculation of the incoming reference signal and internal signals, and the details will be described later. Persons skilled in the art can conceive a plurality of microphones can be applied for an ANC system.

Figure 1B:
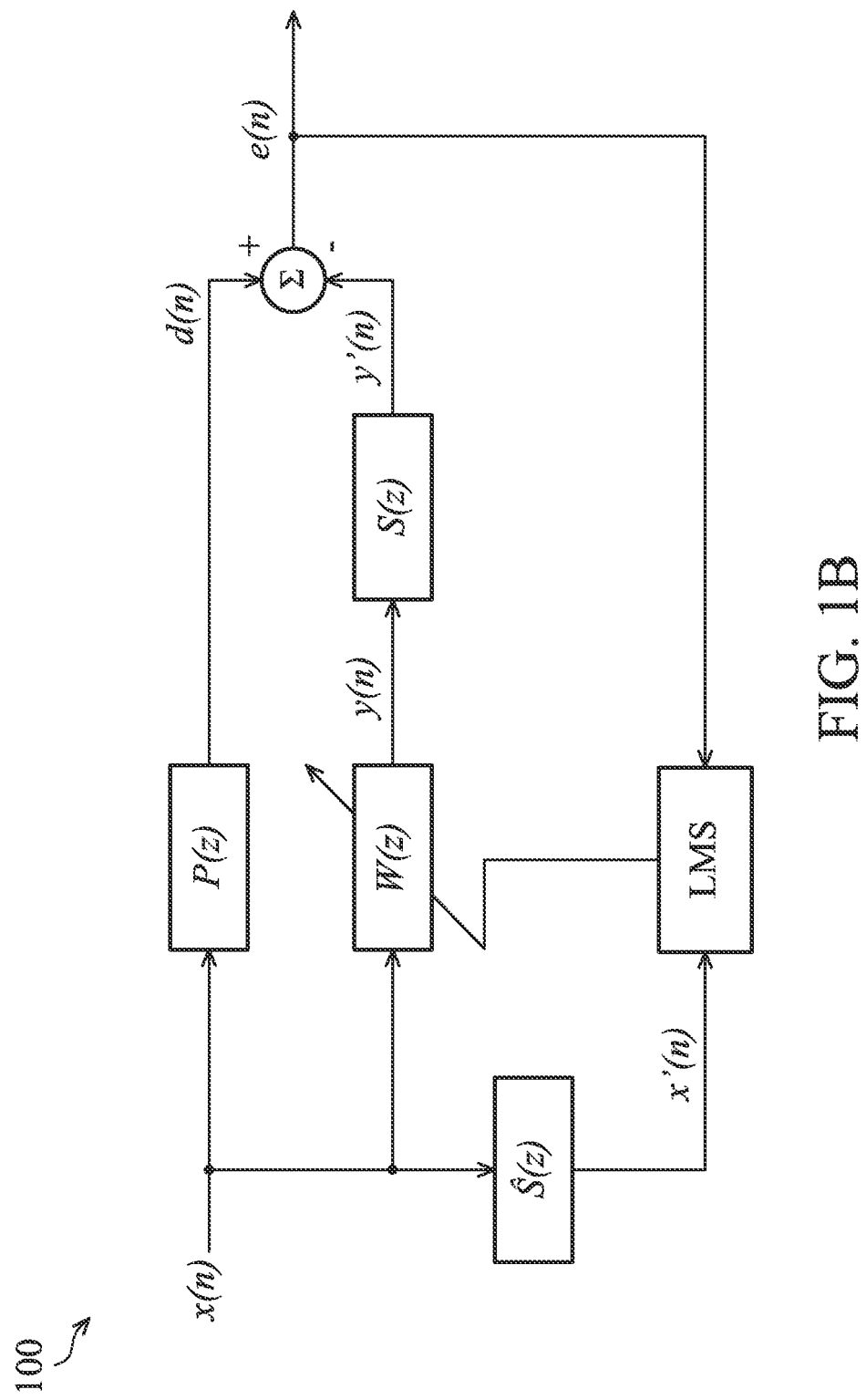
FIG. 1B is a block diagram of the active noise control (ANC) system using the FXLMS algorithm in accordance with the embodiment of FIG. 1A.

FIG. 1B is a block diagram of the active noise control (ANC) system using the FXLMS algorithm in accordance with the embodiment of FIG. 1A. P(z) is the transfer function of the primary path from the noise source to the error microphone 120. The incoming signal x(n) is a reference signal. S(z) is the transfer function of the secondary path, and $\hat{S}(z)$ is its estimate. The primary noise d(n) from the noise source is cancelled or degraded by the anti-noise signal y(n) generated by the adaptive filter W(z). The anti-noise signal y(n) is produced by the secondary-path loudspeaker 130 and e(n) is the residual noise picked up by the error microphone 120. For example, the anti-noise signal y(n) is filtered through the secondary path S(z) and is subtracted from the primary noise d(n) to generate the residual noise, i.e. residual error, e(n). The residual noise e(n) is fed back into the controller 110 for a predetermined computation, e.g. LMS computation or NLMS computation . . . etc.

The secondary path between e(n) and y(n) includes the loudspeaker 130, the error microphone 120, and the acoustic path between the loudspeaker 130 and the error microphone 120. One having ordinary skill in the art would appreciate that the secondary-path transfer function S(z) is unknown and needs to be compensated. Specifically, the secondary-path estimation filter $\hat{S}(z)$ compensates for the secondary-path effect of S(z), and the compensation of the secondary path transfer function S(z) is a crucial factor which directly impacts the performance of active noise cancellation.

It should be noted that the controller 110 may comprise the adaptive filter W(z), the secondary-path estimation filter $\hat{S}(z)$, and the LMS computation unit (e.g. an LMS filter). The adaptive filter W(z), the secondary-path estimation filter $\hat{S}(z)$, and the LMS computation unit can be implemented by software executed by a central processing unit (CPU) or a digital signal processor (DSP). Alternatively, the adaptive filter W(z), the secondary-path estimation filter $\hat{S}(z)$, and the LMS computation unit can also be implemented by specific hardware circuits, or equivalent logic circuits.

Figure 2:
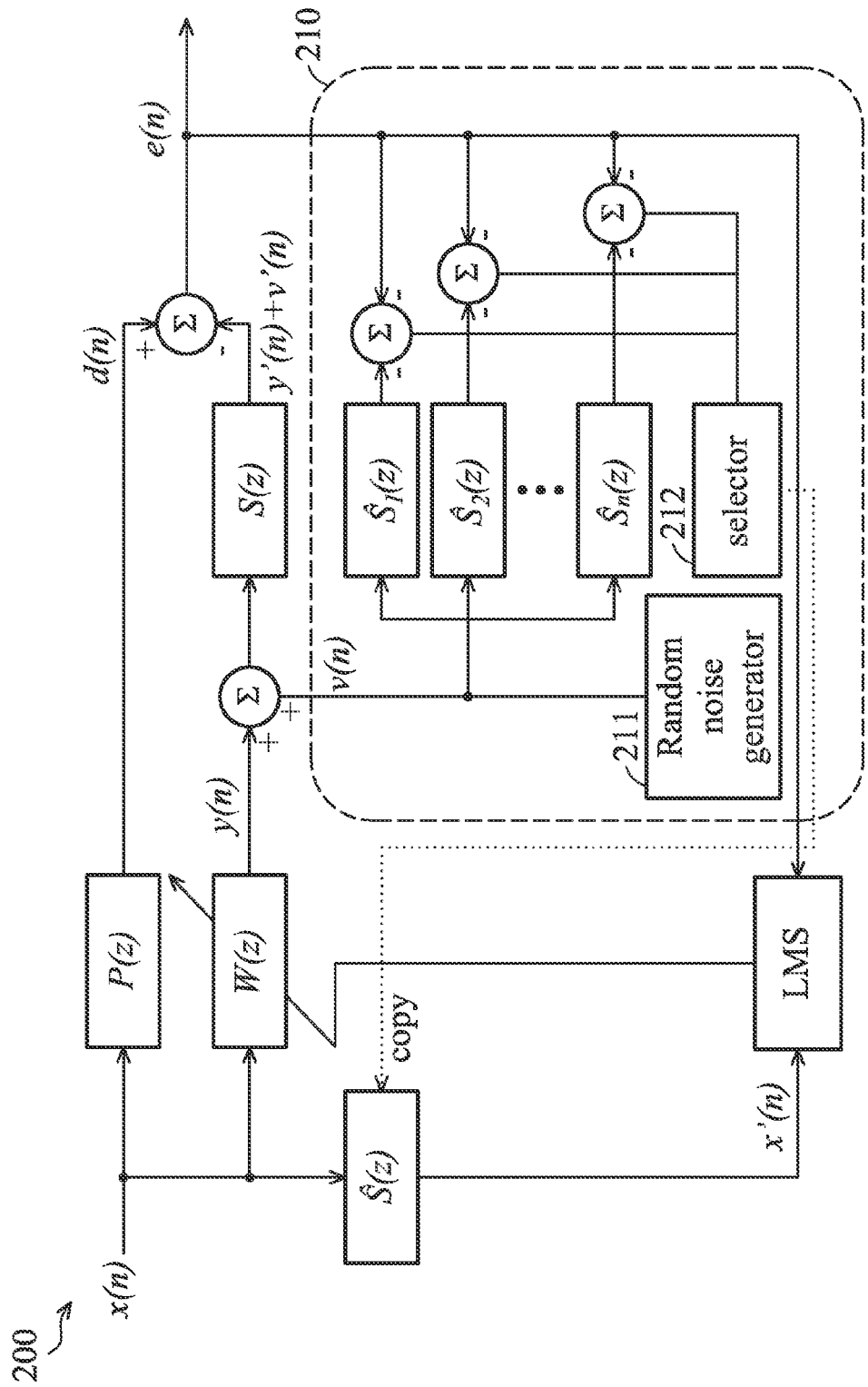
FIG. 2 is a block diagram of the ANC system in accordance with another embodiment of the invention.

FIG. 2 is a block diagram of the ANC system 200 in accordance with another embodiment of the invention. A plurality of pre-trained (or predetermined) candidate secondary-path estimation filters $\hat{S}_1(z) \sim \hat{S}_n(z)$ is used to model the filter initial coefficients without adaptation. For example, in block 210, which is indicative of a selection phase, a random noise generator 211 generates a random noise signal v(n), and the random noise signal v(n) is further fed into the secondary path S(z) and each of the pre-trained candidate secondary-path estimation filters from $\hat{S}_1(z)$ to $\hat{S}_n(z)$. The residual noise e(n) is obtained by subtracting "y'(n)+v'(n)" from the primary noise d(n). Preferably, the selector 212 selects the path with the smallest error value, and determines the candidate secondary-path estimation filter corresponding to the selected path as the secondary-path estimation filter of the ANC system 200.

Specifically, the candidate secondary-path estimation filter corresponding to the selected path is closest to the real secondary-path transfer function S(z). By selecting one of the most appropriate secondary-path estimation filter from the pre-trained candidate secondary-path estimation filters, the ANC system 200 is capable of handling changes of the secondary-path filter S(z) without adaptation. The ANC system 200 may achieve better performance with a proper coverage of the pre-trained candidate secondary-path estimation filters $\hat{S}(z)$.

Figure 3:
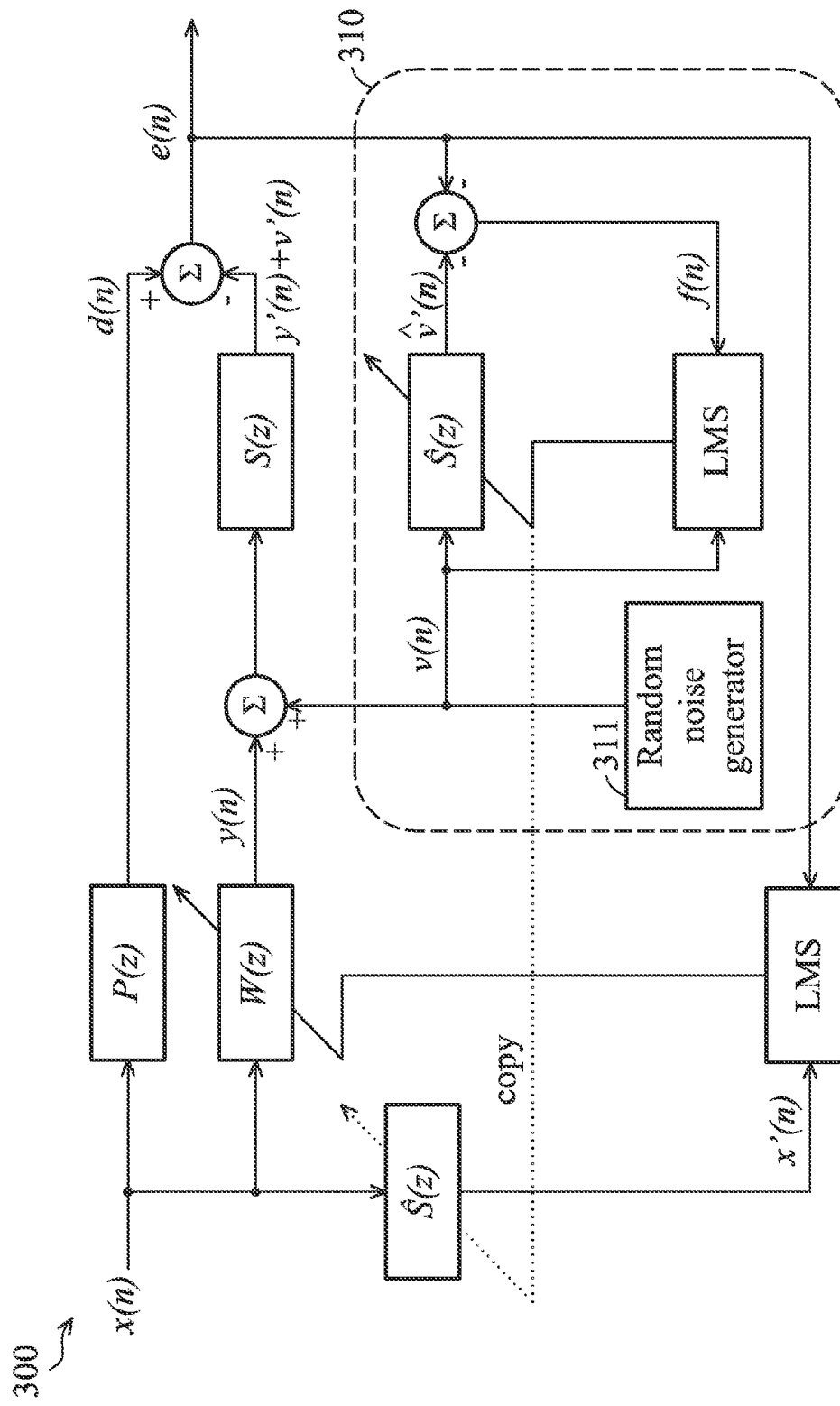
FIG. 3 is a block diagram of the ANC system with online adaptation of secondary-path estimation filter $\hat{S}(z)$ auto-selection in accordance with an embodiment of the invention.

FIG. 3 is a block diagram of an ANC system 300 with online adaptation of secondary-path estimation filter $\hat{S}(z)$ auto-selection in accordance with an embodiment of the invention. Compared with FIG. 1A, an additional block 310, which is indicative of a selection phase, is deployed in the ANC system 300. In block 310, a random noise generator 311 generates a random noise signal v(n) such as zero-mean white noise which is uncorrelated with the primary noise d(n). The random noise signal v(n) is added to the adaptive filter output y(n) to drive the secondary source. In addition, the adaptive filter $\hat{S}(z)$ is added in parallel with the secondary path S(z) to estimate it online. The input signal used for $\hat{S}(z)$ is the random noise signal v(n).

It is useful to define the component of the error due to the original noise as:

$$u(n)=d(n)-s(n)*y(n)$$

$$=[p(n)-s(n)*w(n)]*x(n)$$

where p(n), s(n), and w(n) are the impulse responses of P(z), S(z) and W(z) at time n. Since the reference signal x(n) is uncorrelated with v(n), u(n) is also uncorrelated with v(n). Therefore, the LMS solution is unaffected by the presence of the interference u(n).

The coefficients of the adaptive filter $\hat{S}(z)$ are updated by the LMS algorithm, which is expressed as:

$$\hat{s}(n+1)=\hat{s}(n)+\mu v(n)f(n)$$

$$=\hat{s}(n)+\mu v(n)[v'(n)-\hat{v}'(n)]-\mu v(n)u(n)$$

Where $\hat{s}(n)$ is the coefficient vector of $\hat{S}(z)$, and v(n) is the reference signal vector. The expected value of $\hat{s}(n)$ converges to its optimal solution s(n), provided v(n) and u(n) are uncorrelated.

Accordingly, v'(n) generates the error signal for modeling the filters $\hat{S}(z)$ and the adaptive filter W(z) which are respectively given as:

$$e(n)=d(n)-y'(n)-v'(n)$$

$$f(n)=y'(n)+v'(n)-d(n)-\hat{v}'(n)$$

The mixed signal y'(n)+v'(n), e.g. a compensation signal, is output to the loudspeaker 130 to cancel or compensate the primary noise d(n). Thus, the residual noise e(n) picked up by the error microphone 120 contains both the residual noise and the random noise component. To estimate the random noise component picked up by the error microphone 120, v(n) is filtered by an adaptive secondary-path estimation filter $\hat{S}(z)$. The estimated random noise component v'(n) is subtracted from e(n) to obtain the true error signal e'(n) if $\hat{S}(z)=S(z)$. This noise-free error signal is then used to update the adaptive filter W(z). Therefore, the adaptive filter $\hat{S}(z)$ performs the online cancelling of the random noise component by a predetermined computational algorithm, e.g. LMS or NLMS . . . etc.

It should be noted that the random noise generator 311 can be replaced by an audio source. For example, in some applications such as headphones, the audio source of the ANC system is also used to play intended audio signals (such as speech and music) during the ANC operations. To prevent the ANC system from canceling the desired audio signal and to avoid the audio signal acting as interference that degrades the ANC performance, the similar blocks shown in FIG. 3 can be used.

As shown in FIG. 3, the adaptive filter $\hat{S}(z)$ performs the adaptive system identification of the secondary path S(z) using the random noise signal v(n) as the excitation signal. In general, when the random noise v(n) is uncorrelated with the anti-noise y(n), a perfect model can be obtained, i.e. $\hat{S}(z)=S(z)$. Thus, the error signal is the true residual noise used for the FXLMS algorithm. Therefore, the performance of the FXLMS algorithm will not degrade with the additional random noise, and the ANC system will not cancel the random noise (or the desired audio component) because the random noise (or the desired audio component) is not fed back into the LMS algorithm.

Figure 4:
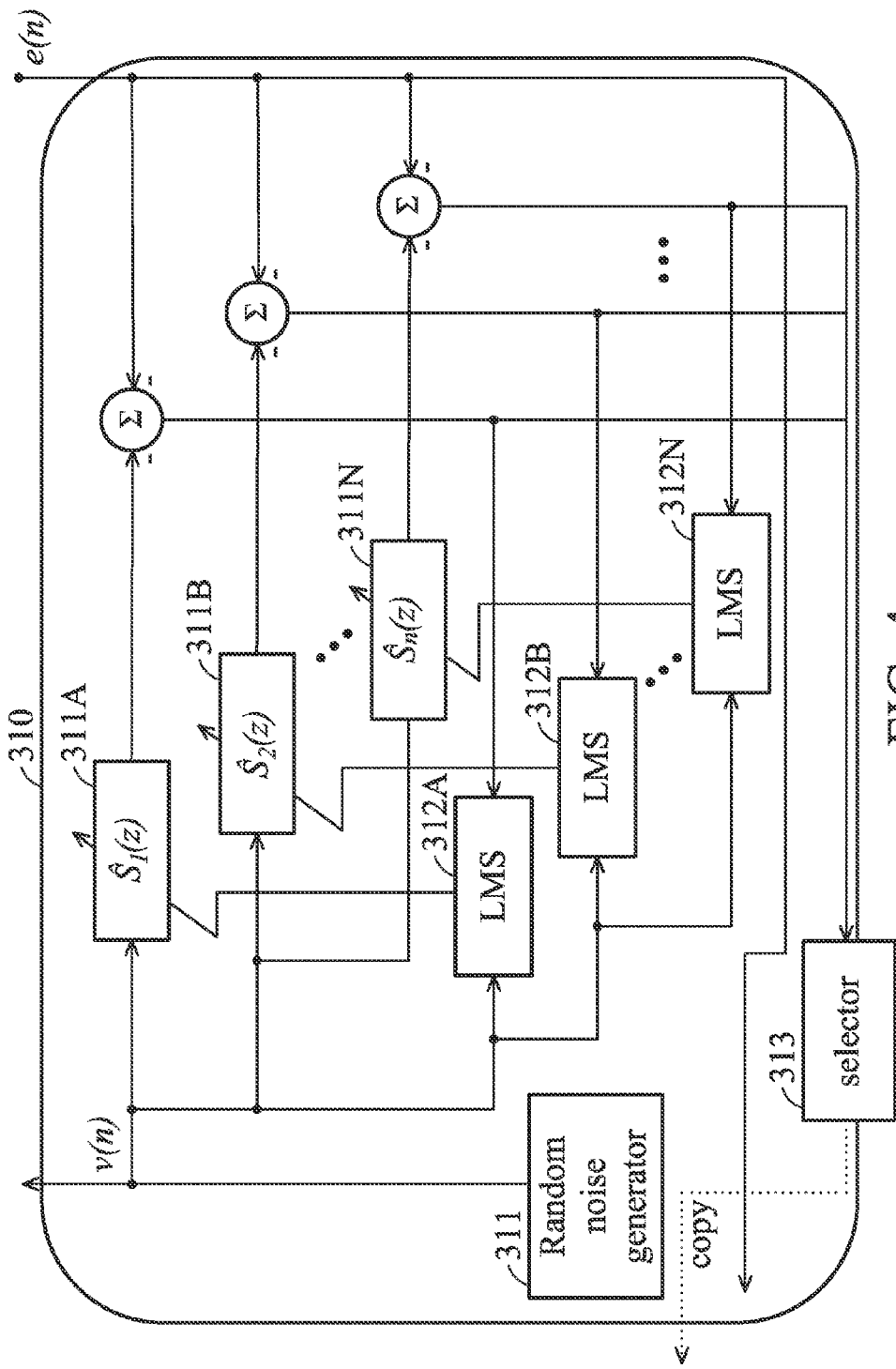
FIG. 4 is a block diagram of a first example of the selection phase in accordance with the embodiment of FIG. 3.

FIG. 4 is a block diagram of a first example of the selection phase in accordance with the embodiment of FIG. 3. In the first example of the selection phase 310, a plurality of LMS computation units (e.g. LMS filters 312A~312N) are deployed. The random noise signal v(n) from the random noise generator 311 is fed into each of the LMS computation units and each of the secondary-path estimation filters (e.g. 311A~311N). Each LMS computation unit may update the coefficients of the corresponding secondary-path filter based on the summation value in each path. For example, the LMS computation unit 312A receives the summation value of the $\hat{S}_1(z)$ output $v_1'(n)$ and the residual noise $e(n)$, and update the coefficients of the secondary-path estimation filter $\hat{S}_1(z)$ based on the summation value. Similarly, the LMS computation unit 312B receives the summation value of the $\hat{S}_2(z)$ output $v_2'(n)$ and the residual noise $e(n)$, and update the coefficients of the secondary-path filter $\hat{S}_2(z)$.

The selector 313 may select one of the secondary-path estimation filters $\hat{S}_1(z)$~$\hat{S}_n(z)$ having the smallest error, and determine the selected secondary-path estimation filter as the secondary-path filter of the ANC system 300. It should be noted that the adaptation procedure is performed online, and the secondary-path estimation filter with the smallest error may change according to practical situations. In addition, the initial coefficients of S(z) can be selected from multiple pre-trained secondary-path estimation filters, and it reduces the differences of the pre-trained secondary-path estimation filters. However, the coefficients of the adaptive filter W(z) are frozen when the adaption procedure is being performed. With better initial coefficients of the secondary-path estimation filters, the converged time can be reduced and better adaptation results can be obtained.

Figure 5:
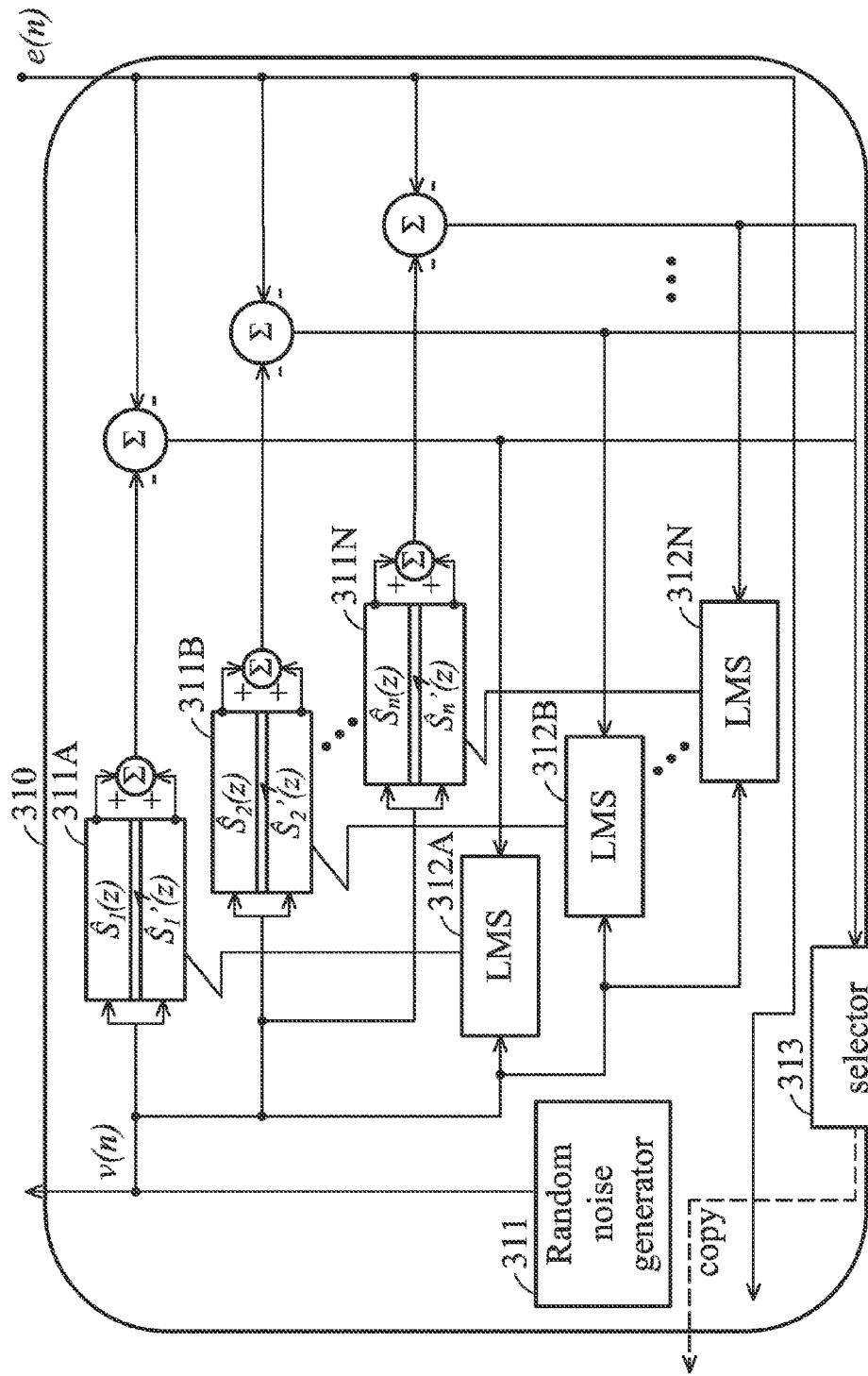
FIG. 5 is a block diagram of a second example of the selection phase in accordance with the embodiment of FIG. 3.

FIG. 5 is a block diagram of a second example of the selection phase in accordance with the embodiment of FIG. 3. In the second example of the selection phase 310, a plurality of LMS computation units (e.g. 312A~312N) are deployed in the controller. However, a pre-trained secondary-path estimation filter is further used in parallel to the adaptive secondary-path estimation filter. For example, the pre-trained secondary-path estimation filter $\hat{S}_1(z)$ is placed in parallel to the adaptive secondary-path estimation filter $\hat{S}_1'(z)$, and the output of $\hat{S}_1(z)$ and $\hat{S}_1'(z)$ are added together to produce a filtered random noise $v_1(n)$. Similarly, the pre-trained secondary-path estimation filter $\hat{S}_2(z)$ is placed in parallel to the adaptive secondary-path estimation filter $\hat{S}_2'(z)$, and the output of $\hat{S}_2(z)$ and $\hat{S}_2'(z)$ are added together. The random noise $v(n)$ is fed into each of the LMS computation units and each of the pre-trained secondary-path estimation filters and adaptive secondary-path estimation filters.

Each LMS computation unit may update the coefficients of the corresponding secondary-path filter based on the summation value in each path. For example, the LMS computation unit 312A receives the summation value of the filter pair's (e.g. $\hat{S}_1(z)$ and $\hat{S}_1'(z)$) output $v_1'(n)$ and the residual noise $e(n)$, and updates the coefficients of the secondary-path filter $\hat{S}_1'(z)$. Similarly, the LMS computation unit 312B receives the summation value of the filter pair's (e.g. $\hat{S}_2(z)$ and $\hat{S}_2'(z)$) output $v_2'(n)$ and the residual noise $e(n)$, and update the coefficients of the secondary-path filter $\hat{S}_2'(z)$.

The selector 313 may select one of the secondary-path estimation filters $\hat{S}_1'(z)$~$\hat{S}_n'(z)$ having the smallest error, and determine the selected secondary-path estimation filter as the secondary-path filter of the ANC system 300.

Figure 6:
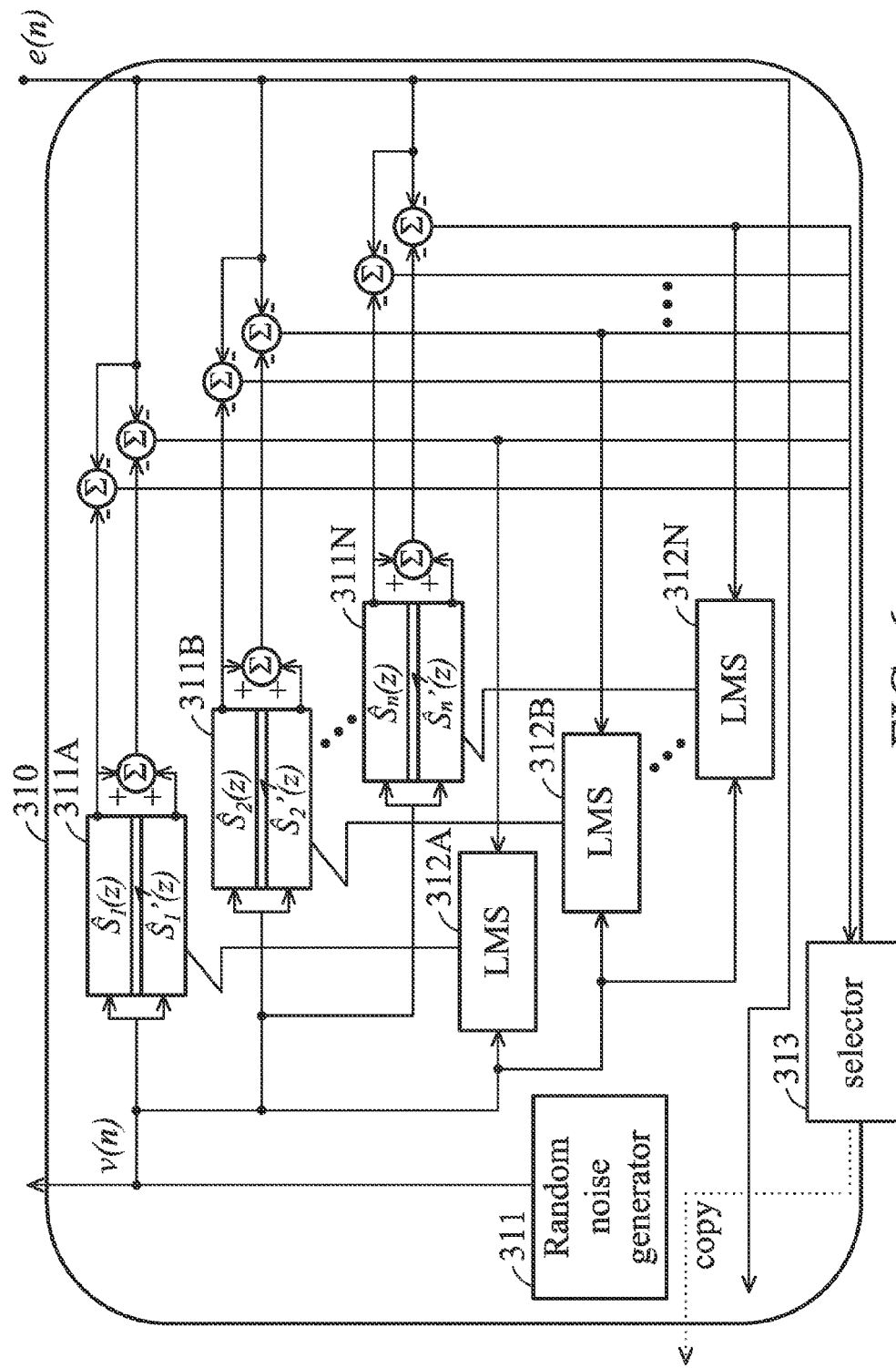
FIG. 6 is a block diagram of a third example of the selection phase in accordance with the embodiment of FIG. 3.

FIG. 6 is a block diagram of a third example of the selection phase in accordance with the embodiment of FIG. 3. In the third example of the selection phase 310, a plurality of LMS computation units (e.g. 312A~312N) are also deployed in the controller. The output of each pre-trained secondary-path estimation filter is added to the residual noise $e(n)$, and the output of each filter pair is also added to the residual noise $e(n)$. However, each LMS computation unit receives the summation value of the corresponding filter pair's output and the residual noise $e(n)$. For example, the LMS computation unit 312A receives the summation value of the filter pair's (e.g. $\hat{S}_1(z)$ and $\hat{S}_1'(z)$) output $v_1'(n)$ and the residual noise $e(n)$, and updates the coefficients of the secondary-path filter $\hat{S}_1'(z)$. Similarly, the LMS computation unit 312B receives the summation value of the filter pair's (e.g. $\hat{S}_2(z)$ and $\hat{S}_2'(z)$) output $v_2'(n)$ and the residual noise $e(n)$, and update the coefficients of the secondary-path filter $\hat{S}_2'(z)$.

In addition, the selector 313 receives the summation value of the each pre-trained secondary-path estimation filter and the residual noise $e(n)$, and the summation value of each filter pair's output and the residual noise $e(n)$. Then, the selector 313 selects one of the pre-trained secondary-path estimation filters and the adaptive secondary-path estimation filters with the smallest error as the secondary-path estimation filter of the ANC system. Specifically, the architecture of the selection phase (block) 310 in FIG. 6 is a hybrid type of those in FIG. 4 and FIG. 5, and the selection phase in FIG. 6 maintains the advantage after the adaptive secondary-path estimation filters converge. Furthermore, while the real secondary-path transfer function changes (e.g. the environment of the ANC system changes), the selection phase in FIG. 6 is capable of detecting the changes as that in FIG. 3.

Figure 7:
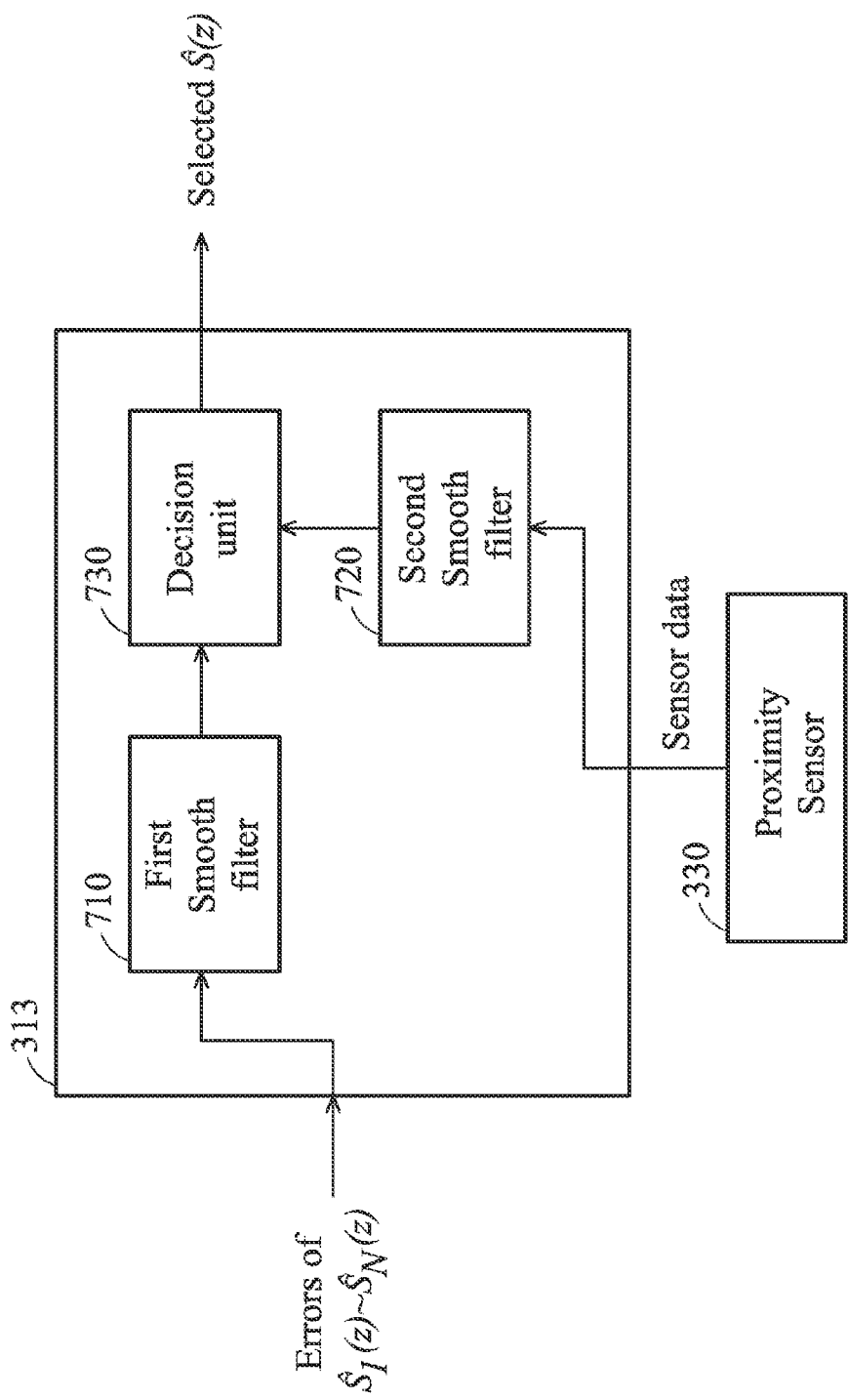
FIG. 7 is a block diagram of the selector in accordance with an embodiment of the invention.

FIG. 7 is a block diagram of the selector in accordance with an embodiment of the invention. In an embodiment, referring to both FIG. 4 and FIG. 7, the ANC system 300 further comprises a proximity sensor 330 which can be used to detect whether the ANC system 300 (e.g. a smartphone) is close to the ear or not while calling. The proximity information detected by the proximity sensor may help the selector 313 to select a better secondary-path filter.

The selector 313 is configured to choose a more appropriate secondary-path filter from a set of pre-trained secondary-path estimation filters and/or a set of adaptive secondary-path estimation filters. In an embodiment, the selector 313 always chooses the pre-trained secondary-path estimation filter or the adaptive secondary-path estimation filter with the smallest error even when the downlink is not available.

In an alternative embodiment, as shown in FIG. 7, the selector 313 uses the sensor data to help selecting the more appropriate secondary-path filter. For example, the errors of the pre-trained secondary-path estimation filters and/or the adaptive secondary-path estimation filters are inputted to a first smooth filter 710 to obtain smoothed errors. In addition, the sensor data from the proximity sensor 330 are also inputted to a second smooth filter 720 to obtain smoothed sensor data. The decision unit 730 is configured to make the decision of the secondary-path filter selection. For example, if a downlink of the ANC system is available, the decision unit 730 selects the pre-trained secondary-path estimation filter with the smallest smoothed error as the secondary-path filter of the ANC system. If the downlink of the ANC system is not available, the decision unit makes the decision using the smoothed sensor data.

Figure 8:
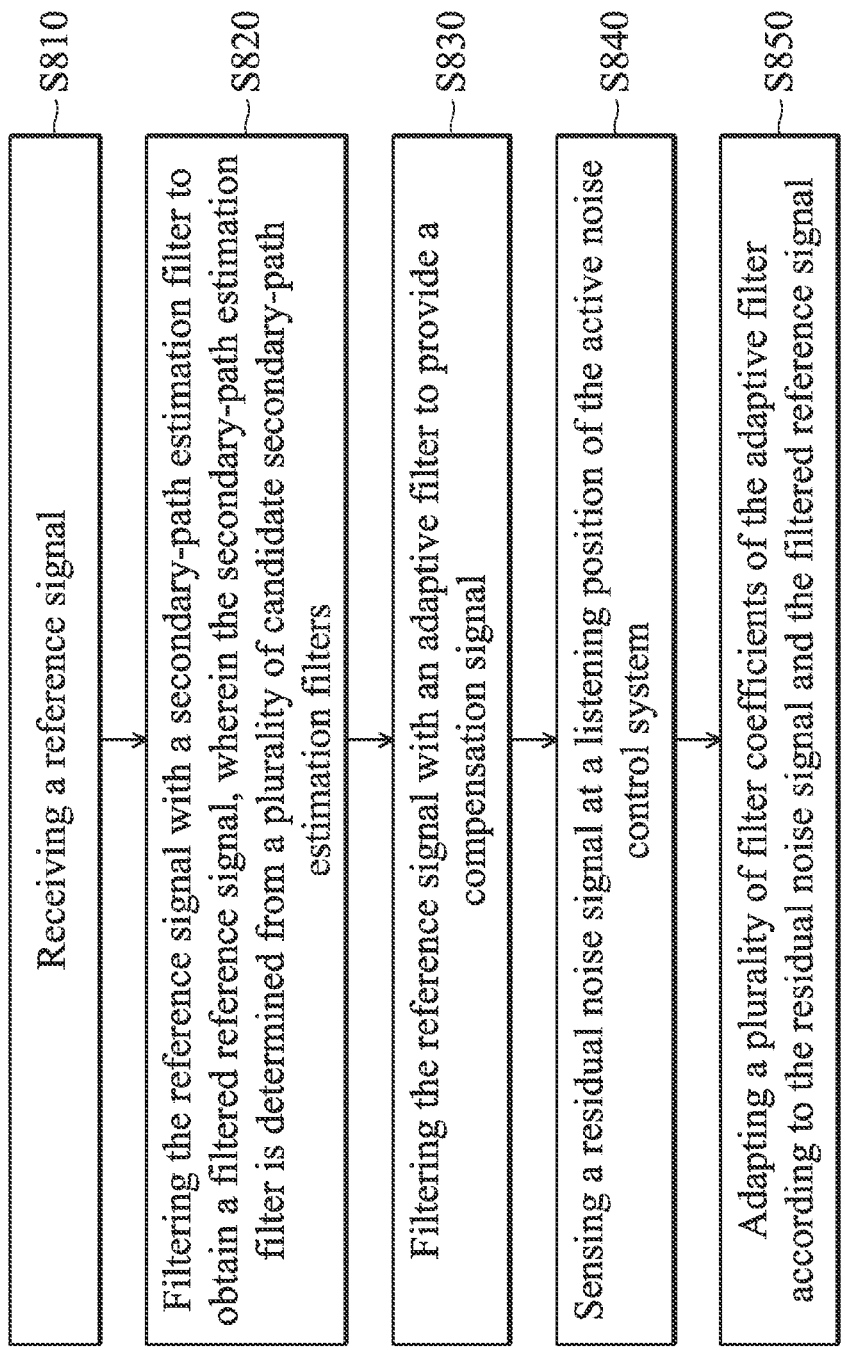
FIG. 8 is a flow chart of an auto-selection method for modeling a secondary path for an active noise control system in accordance with an embodiment of the invention.

FIG. 8 is a flow chart of an auto-selection method for modeling a secondary path for an active noise control system in accordance with an embodiment of the invention. In step S810, a reference signal is received. In step S820, the reference signal is filtered with a secondary-path estimation filter to obtain a filtered reference signal, wherein the secondary path estimation filter is determined from a plurality of candidate secondary-path estimation filters.

In step S830, the reference signal is filtered with an adaptive filter to provide a compensation signal (e.g. the mixed signal y'(n)+v'(n) shown in FIG. 3). In step S840, a residual noise signal is sensed at a listening position (e.g. the error microphone 120) of the active noise control system. In step S850, a plurality of filter coefficients of the adaptive filter is adapted according to the residual noise signal and the filtered reference signal. It should be noted that the adapting step in S850 can be implemented by various architectures shown in FIGS. 3-6.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An auto-selection method for modeling a secondary path for an active noise control system, comprising:
   receiving a reference signal;
   filtering the reference signal with a secondary-path estimation filter to obtain a filtered reference signal, wherein the secondary-path estimation filter is determined from a plurality of candidate secondary-path estimation filters;
   filtering the reference signal with an adaptive filter to provide a compensation signal;
   sensing a residual noise signal at a listening position of the active noise control system; and
   adapting a plurality of filter coefficients of the adaptive filter according to the residual noise signal and the filtered reference signal.

2. The method as claimed in claim 1, wherein each candidate secondary-path estimation filter is a predetermined secondary-path estimation filter.

3. The method as claimed in claim 2, wherein the determining step comprises:
   receiving a random noise signal;
   filtering the random noise signal with each candidate secondary-path estimation filter to obtain a filtered random noise signal for each candidate secondary-path estimation filter;
   determining one of the plurality of candidate secondary-path estimation filters as the secondary-path estimation filter based on the residual noise signal and the filtered random noise signal of each predetermined secondary-path estimation filter.

4. The method as claimed in claim 1, wherein the filter coefficients of the adaptive filter are frozen while determining the secondary-path estimation filter.

5. The method as claimed in claim 4, wherein the determined secondary-path estimation filter is the predetermined secondary-path estimation filter with the smallest summation value of the filtered random noise signal and the residual noise signal.

6. The method as claimed in claim 1, wherein a filtered-x least mean square (FxLMS) algorithm is used in the adapting step.

7. The method as claimed in claim 1, wherein each candidate secondary-path estimation filter is an adaptive secondary-path estimation filter.

8. The method as claimed in claim 7, wherein each candidate secondary-path estimation filter has a corresponding filter for adapting filter coefficients of the candidate secondary-path estimation filter.

9. The method as claimed in claim 8, wherein the determining step comprises:
   receiving a random noise signal;
   filtering the random noise signal with each candidate secondary-path estimation filter to obtain a filtered random noise signal for each candidate secondary-path estimation filter;
   adapting the filter coefficients of each candidate secondary-path estimation filter by the corresponding filter based on the residual noise signal and a summation value of the filtered random noise signal of each candidate secondary-path estimation filter;
   determining the candidate secondary-path estimation filters with the smallest summation value as the secondary-path estimation filter.

10. The method as claimed in claim 1, wherein each candidate secondary-path estimation filter is a combination of a predetermined secondary-path estimation filter and an adaptive secondary-path estimation filter.

11. The method as claimed in claim 10, wherein each candidate secondary-path estimation filter has a corresponding filter for adapting filter coefficients of the adaptive secondary-path estimation filter.

12. The method as claimed in claim 11, wherein the determining step comprises:
   receiving a random noise signal;
   filtering the random noise signal with the predetermined secondary-path estimation filter and the adaptive secondary-path estimation filter of each candidate secondary-path estimation filter to obtain a first filtered random noise signal and a second filtered random noise signal, respectively;
   adapting the filter coefficients of the adaptive secondary-path estimation filter of each candidate secondary-path based on the residual noise signal and a summation value of the first filtered random noise signal and the second filtered random noise signal of each candidate secondary-path estimation filter; and
   determining the candidate secondary-path estimation filters with the smallest summation value as the secondary-path estimation filter.

13. The method as claimed in claim 11, wherein the determining step comprises:
   receiving a random noise signal;
   filtering the random noise signal with the predetermined secondary-path estimation filter and the adaptive secondary-path estimation filter of each candidate secondary-path estimation filter to obtain a first filtered random noise signal and a second filtered random noise signal, respectively;
   adapting the filter coefficients of the adaptive secondary-path estimation filter of each candidate secondary-path based on the residual noise signal and a first summation value of the first filtered random noise signal and the second filtered random noise signal of each candidate secondary-path estimation filter; and
   determining the candidate secondary-path estimation filter, which has the smallest second summation value of the first filtered random noise signal and the residual noise signal, as the secondary-path estimation filter.

14. The method as claimed in claim 1, wherein the determining step comprises:
   utilizing a proximity sensor of the active noise control system to obtain sensor data; and determining the secondary-path estimation filter from the plurality of candidate secondary-path estimation filters based on the sensor data.

15. An active noise control system, comprising:
a secondary-path estimation filter configured to filter a reference signal to obtain a filtered reference signal;
an adaptive filter configured to filter the reference signal to provide a compensation signal; and
a computation unit configured to determine the secondary path estimation filter from a plurality of candidate secondary-path estimation filters,
wherein the computation unit further adapts a plurality of filter coefficients of the adaptive filter according to the filtered reference signal and a residual noise signal sensed by an error microphone deployed at a listening position of the active noise control system.

16. The active noise control system as claimed in claim 15, wherein each candidate secondary-path estimation filter is a predetermined secondary-path estimation filter.

17. The active noise control system as claimed in claim 16, further comprising:
a random noise generator for generating a random noise signal;
a plurality of candidate secondary-path estimation filters, wherein the random noise signal is filtered with each candidate secondary-path estimation filter to obtain a filtered random noise signal; and
a selector configured to determine one of the plurality of candidate secondary-path estimation filters as the secondary-path estimation filter based on the residual noise signal and the filtered random noise signal of each predetermined secondary-path estimation filter.

18. The active noise control system as claimed in claim 15, wherein the filter coefficients of the adaptive filter are frozen while determining the secondary-path estimation filter.

19. The active noise control system as claimed in claim 18, wherein the determined secondary-path estimation filter is the predetermined secondary-path estimation filter with the smallest summation value of the filtered random noise signal and the residual noise signal.

20. The active noise control system as claimed in claim 15, wherein the computation unit uses a filtered-x least mean square (FxLMS) algorithm to adapt the plurality of filter coefficients.

21. The active noise control system as claimed in claim 15, wherein each candidate secondary-path estimation filter is an adaptive secondary-path estimation filter.

22. The active noise control system as claimed in claim 21, wherein each candidate secondary-path estimation filter has a corresponding filter for adapting filter coefficients of the candidate secondary-path estimation filter.

23. The active noise control system as claimed in claim 22, further comprising:
a random noise generator for generating a random noise signal, wherein each filter adapts the filter coefficients of the corresponding candidate secondary-path estimation filter based on the residual noise signal and a summation value of the filtered random noise signal of each candidate secondary-path estimation filter; and
a selector configured to determine the candidate secondary-path estimation filters, which has the smallest summation value, as the secondary-path estimation filter, wherein the random noise signal is filtered with each candidate secondary-path estimation filter to obtain a filtered random noise signal.

24. The active noise control system as claimed in claim 15, wherein each candidate secondary-path estimation filter is a combination of a predetermined secondary-path estimation filter and an adaptive secondary-path estimation filter.

25. The active noise control system as claimed in claim 24, wherein each candidate secondary-path estimation filter has a corresponding filter for adapting filter coefficients of the adaptive secondary-path estimation filter.

26. The active noise control system as claimed in claim 25, further comprising:
a random noise generator for generating a random noise signal; and
a selector,
wherein the random noise signal is filtered with the predetermined secondary-path estimation filter and the adaptive secondary-path estimation filter of each candidate secondary-path estimation filter to obtain a first filtered random noise signal and a second filtered random noise signal, respectively,
wherein each filter adapts the filter coefficients of the adaptive secondary-path estimation filter of each corresponding candidate secondary-path based on the residual noise signal and a summation value of the first filtered random noise signal and the second filtered random noise signal of each candidate secondary-path estimation filter
wherein the selector determines the candidate secondary-path estimation filters with the smallest summation value as the secondary-path estimation filter.

27. The active noise control system as claimed in claim 25, further comprising:
a random noise generator for generating a random noise signal; and
a selector,
wherein the random noise signal is filtered with the predetermined secondary-path estimation filter and the adaptive secondary-path estimation filter of each candidate secondary-path estimation filter to obtain a first filtered random noise signal and a second filtered random noise signal, respectively,
wherein each filter adapts the filter coefficients of the adaptive secondary-path estimation filter of each corresponding candidate secondary-path based on the residual noise signal and a summation value of the first filtered random noise signal and the second filtered random noise signal of each candidate secondary-path estimation filter
wherein the selector determines the candidate secondary-path estimation filter, which has the smallest second summation value of the first filtered random noise signal and the residual noise signal, as the secondary-path estimation filter.

28. The active noise control system as claimed in claim 15, further comprising:
a proximity sensor to obtain sensor data; and
a selector, configured to determine the secondary-path estimation filter from the plurality of candidate secondary-path estimation filters based on the sensor data.

* * * * *